United States Patent [19]
Sridhar et al.

[11] Patent Number: 5,960,035
[45] Date of Patent: Sep. 28, 1999

[54] METHOD AND APPARATUS FOR LOAD BALANCING FOR A PROCESSOR OPERATED DATA COMMUNICATIONS DEVICE

[75] Inventors: Manickam R. Sridhar, Holliston; Neil Sheer, Foxboro, both of Mass.

[73] Assignee: Motorola Inc., Schaumburg, Ill.

[21] Appl. No.: 08/536,543

[22] Filed: Sep. 29, 1995

[51] Int. Cl.$^6$ .............................. H04B 13/02; H04L 5/16
[52] U.S. Cl. ........................................ 375/219; 375/222
[58] Field of Search .................................. 375/219, 222, 375/225; 395/200.51, 200.7

[56] References Cited

U.S. PATENT DOCUMENTS

| | | | |
|---|---|---|---|
| 4,058,838 | 11/1977 | Crager et al. | 358/257 |
| 4,466,062 | 8/1984 | Krokor | 364/200 |
| 4,701,630 | 10/1987 | Annunziata et al. | 307/112 |
| 4,931,250 | 6/1990 | Greszczuk | 375/8 |
| 4,965,641 | 10/1990 | Blackwell et al. | 375/379 |
| 4,984,248 | 1/1991 | Hong | 375/7 |
| 5,021,949 | 6/1991 | Morten et al. | 364/200 |
| 5,644,593 | 7/1997 | Bailey et al. | 345/222 |
| 5,657,345 | 8/1997 | Lazaridis | 375/222 |
| 5,729,573 | 3/1998 | Bailey et al. | 375/222 |
| 5,748,617 | 5/1998 | McLain, Jr. | 370/244 |

*Primary Examiner*—Stephen Chin
*Assistant Examiner*—Mohammad Ghayour
*Attorney, Agent, or Firm*—Nancy R. Gamburd

[57] ABSTRACT

An apparatus (200) and method for load balancing for a processor (103) operable in data terminal equipment (102), such as a personal computer or workstation, for operation of a data communications program for data transmission and reception over a communications channel (105), concurrently with the operation of other applications programs. The apparatus includes a loading selector (205) coupleable to a user interface (100) for selection of a data transfer priority. A priority translator (210) coupled to the load selector (205) maps or translates the data transfer priority to a modulation mode or to a subset of modulation modes. The priority translator (210) may also determine processor availability, which is then also mapped to a modulation mode or to a subset of modulation modes. A modulation mode controller (215) coupled to the priority translator (210) then limits or overrides automode functions or operations during a training period of the data communications devices for data transfer, limiting the modulation mode to one within the subset of modulation modes. Depending upon the data transfer priority selected by the user, the processor (103) has sufficient remaining availability for the concurrent and effective operation of other applications programs.

40 Claims, 4 Drawing Sheets

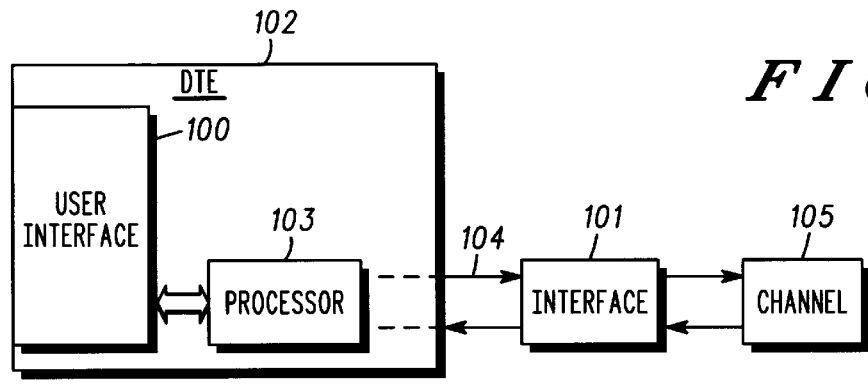
FIG.1
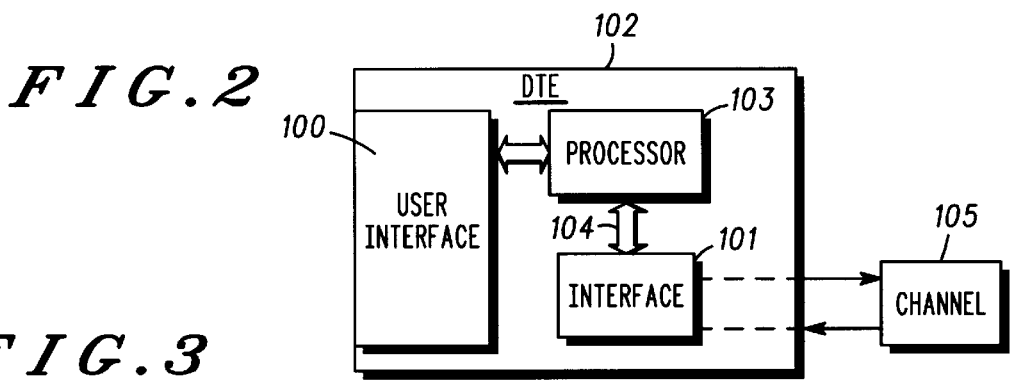
FIG.2
FIG.3
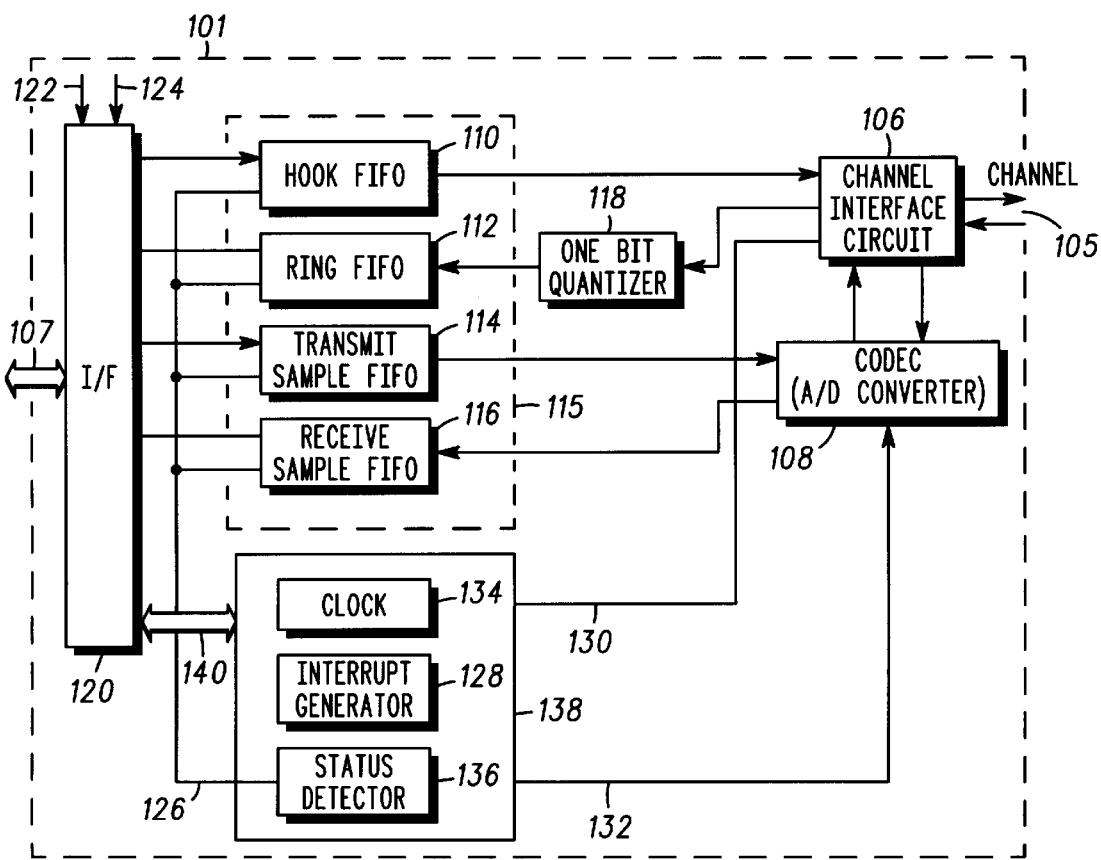

METHOD AND APPARATUS FOR LOAD
BALANCING FOR A PROCESSOR
OPERATED DATA COMMUNICATIONS
DEVICE

CROSS-REFERENCE TO A RELATED APPLICATION

This invention is related to the U.S. patent application Ser. No. 08/521,717 filed on Aug. 31, 1995, now U.S. Pat. No. 5,799,064 and U.S. patent application Ser. No. 08/607,911 filed on Feb. 28, 1996, now U.S. Pat. No. 5,802,153, incorporated herein by reference.

FIELD OF THE INVENTION

The invention relates in general to data communications devices, and more particularly, to a method and apparatus for load balancing, for a processor based data communications device, for data transmission and reception.

BACKGROUND OF THE INVENTION

As disclosed in the related application, programmable, processor-controlled data terminal equipment ("DTEs"), such as personal computers, workstations, and data terminals, are increasingly common throughout schools, work places, and society in general. In addition, processor capability has been increasing significantly, with increasingly faster and more powerful processors being utilized in computers, such as the PowerPC® processor from Motorola and the Pentium® processor from Intel. These processors may be programmed to perform a variety of functions.

Data communications devices ("DCDs") such as analog and digital modems, terminal adapters, and computer networking devices, generally have been utilized for data transfer between various DTEs over communications channels, such as the Public Switched Telephone Network ("PSTN") or Integrated Services Digital Network ("ISDN"). Such DCDs have typically been separate devices, such as desktop modems, rack-mounted modems, PCMCIA cards, or separate circuit boards utilized within a computer housing. In the prior art, moreover, such DCDs also typically contain several processors, such as a digital signal processor ("DSP") and a microprocessor, or a unitary processor combining the functions of both the DSP and the microprocessor. DCDs have tended to require separate processing capability because DCDs are computationally and mathematically intensive, performing such functions as modulation, demodulation, coding, decoding, data compression, error correction, precoding, equalization, interfacing with the DTE, and other control functions. In addition, DCDs have been performing at ever faster transmission rates, such as 28.8 kbps available under the V.34 standard (International Telecommunication Union ("ITU") Recommendation V.34), and with data compression and error correction protocols available under the ITU V.42 and V.42 bis standards. Such computationally intensive processing would tend to require more processor capability and more processing time than is generally available or desirable from a more general, multipurpose processor utilized in a DTE.

With the advent of increasing processor capability in DTEs, such as that available in the PowerPC® and Pentium® processors, the additional processing capability available in DCDs may no longer be necessary and may be redundant. Provided that such processing capability is available, it may be more cost effective and efficient to provide for a single processor, with appropriate hardware and software, capable of performing both the functions of the various computer applications programs, such as word processing, spreadsheets, mathematical computations and graphics, and the functions of a DCD, such as modulation, demodulation, and data compression. One such combined processor-DCD arrangement was disclosed in Blackwell et al.

U.S. Pat. No. 4,965,641, "Processor Modem", issued Oct. 23, 1990, and incorporated by reference herein.

With the increasing data transmission rates and other complex functions now required for DCDs which are to be compatible with the V.34 and V.42 bis protocols, implementations of a processor modem or other processor DCD may be complicated or difficult and may have increasing and potentially incompatible performance requirements. For example, a difficulty with the implementation of a processor modem is related to the high processing speeds available with the new, general purpose computer processors, which are capable of processing data for transmission at much faster rates than are typically available for actual data transmission over a channel. For example, the computer processor may be able to process data at rates in the megahertz or gigahertz range, which are several orders of magnitude greater than typical data transmission rates, such as 28.8 kbps for V.34 or 64 kbps for ISDN. Correspondingly, data may be arriving from a communications channel continually, at a specific and predetermined data transmission rate, which is typically much slower than the processing rate of the computer processor, and which may not effectively utilize the entire processing capability of the computer processor. For example, it would be an inefficient use of computer processor capability to have the processor waiting to receive data at 28.8 or 14.4 kbps, when the processor could be performing other application functions simultaneously. This mismatch or interface problem between data transmission rates and data processing rates tends to create a "bottleneck" problem, with either too much data available from the processor for transmission (given the data transmission rate), or too little data available from the channel for subsequent processing (given the computer processing capability). With other issues, this interface problem was addressed in the related application referenced above.

In addition, data transmission functions tend to be computationally intensive, potentially involving a tremendous number of calculations for digital signal processing, error control and correction, data compression, and various other modulation and demodulation functions. With such computationally intensive processes, currently available processor modems may not effectively or efficiently process other applications programs concurrently with data transmission. During data transmission, concurrent or simultaneous processing of other applications programs by such devices tends to be slow or to cease altogether, largely due to excessive computational loading of the processor during data transmission. In addition, typically such devices automatically provide for a maximum available data transmission rate, which may be unnecessary, may provide an excessive load to the processor, and may interfere with the simultaneous processing or concurrent operation of other applications. A need has remained, therefore, for an apparatus and method to provide for a balancing and optimizing of the various simultaneous or concurrent loads to the processor, to provide for concurrent operation of a communications application program (with corresponding data transfer over a communications channel), and operation of other applications programs, and to provide for both efficient data transfer and efficient use of processor capability.

BRIEF DESCRIPTION OF THE DRAWINGS

FIG. 1 is an overall block diagram illustrating a DTE coupled to a first embodiment of an interface apparatus (as disclosed in the related application).

FIG. 2 is an overall block diagram illustrating a DTE coupled to a second embodiment of an interface apparatus (as disclosed in the related application).

FIG. 3 is a detailed block diagram illustrating a preferred embodiment of an interface apparatus for data communication between a DTE and a communications channel, as disclosed in the related application.

DETAILED DESCRIPTION OF THE INVENTION

Figure 4:
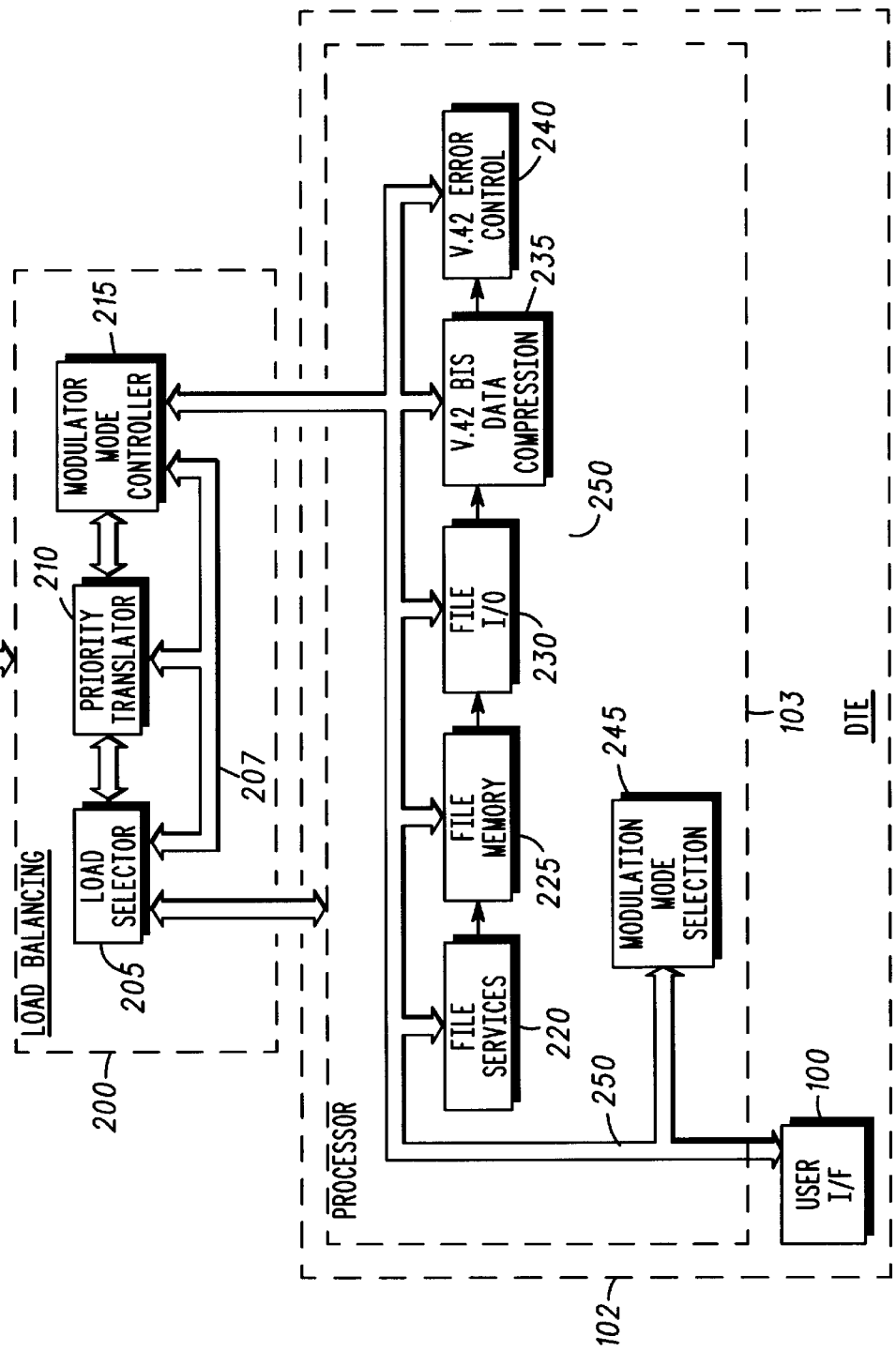
FIG. 4 is a detailed block diagram illustrating a load balancing apparatus in accordance with the present invention.

As mentioned above, a significant difficulty with the implementation of a general purpose processor or computer processor based data communications device, such as a processor modem, concerns effective and optimal load balancing, of the processor, for simultaneous or concurrent operation of a data communications application program with other applications programs. Typically in the prior art, a computer processor based data communications device operates at the highest available data rate and may consume virtually all effective processor availability, time and responsiveness, during data transmission and reception (with processor availability, as discussed below, referring to the remaining amount of processor time and responsiveness, such as processor cycles, available for applications programs, after processing of the operating system and any other necessary, non-applications functions). Such consumption of processor availability may preclude implementation of a more processor intensive modulation mode, such as V.34, and may preclude implementation of a more processor efficient modulation mode, such as a 19.2 kbps data rate available under V.34 using a 2400 symbol rate, compared to a V.32 bis implementation, also with a 2400 symbol rate. In the prior art, moreover, either no other applications program may operate concurrently with data transmission, or if the applications program does operate, the program may run sufficiently slowly so as to be unacceptable to the user.

In addition, most data communications devices operate according to the assumption that a user will always prefer data transmission at the highest possible data transmission rate, without exception. This assumption may often be reasonably based, assuming that faster transmission rates result in shorter connection times on the communications channel and, accordingly, potentially lower communications cost. Indeed, Greszczuk U.S. Pat. No. 4,931,250, entitled "Multimode Modem", discloses a modem which may operate in any number of modulation modes, such as V.32, V.22 bis and V.22. As the local and remote data communication devices may each have this multiple mode capacity, during the initial training period for data communications, typically the local and remote modems mutually select the maximum available data rate for their subsequent data transfers, in a process typically referred to as "automode". For example, under appropriate line and other conditions, local and remote V.34-capable modems may automode and automatically determine that they are able to communicate at a maximum data rate of 28.8 kbps in a V.34 mode. In contrast, depending upon line and other conditions, a local V.34 modem and a remote V.32 bis modem may communicate at one of any number of data rates, from, for example, 2400 bps to 14.4 kbps, and the automode process will attempt to select the maximum data rate of 14.4 kbps but not the rate of 28.8 kbps (which is not mutually available, but is available only to the V.34 modem).

Such automode functions, however, which automatically and without exception select the highest or maximum data rate available between the local and remote DCDs, may be disadvantageous in the utilization of a processor based DCD, such as a processor modem. Because the data transmission at the maximum data rate may effectively consume all processor availability in the DTE operating the data communications program, the central processor of the DTE may not be able to concurrently operate other applications. Depending upon the circumstances, moreover, the length or amount of connection time may also be irrelevant. For example, the user's then current priorities, or the use of dedicated networks or other communications channels, may render irrelevant the length of time of connection. Under these types of circumstances, the operation of other applications programs, in addition to and concurrently with the data communications program, may be more significant and preferrable to the user.

The apparatus and method of the present invention overcomes these various difficulties by allowing the user to individually select and to vary the load to the processor from the data communications application program. In various embodiments, the invention provides for the user to prioritize concurrent applications programs, which then determines an acceptable data transmission rate based on processor availability. In another embodiment, the user directly selects a data transfer priority, such as a desired transmission rate or modulation mode, freeing up the processor to perform other tasks as desired by the user. The user is then able to determine the speed and degree to which, if at all, other applications programs may concurrently or simultaneously operate with data transmission.

Referring to FIG. 1, FIG. 1 is an overall block diagram illustrating a DTE 102 having a processor 103 and user interface 100, and a first embodiment of an interface apparatus 101 as disclosed in the related application. FIG. 1 illustrates a DTE 102, such as a personal computer, a file server, or a workstation, containing a processor 103, such as a PowerPC® or Pentium® processor. The processor 103, through lines, cable or bus 104, is connected to the interface apparatus 101, which is further connected to a communications channel (or "channel") 105 for data transmission and reception. The lines, cable or bus 104 may be any type of arrangement appropriate for connection to a computer, such as an ISA or PCI bus or a PCMCIA standard compatible slot. The interface apparatus 101 as disclosed in the related application performs such functions, typically found in a modem or other data communication device, of ring detection, pulse and tone dialing, and analog-digital conversion. The processor 103, containing or operating under a communications application program, such as a modem application program, typically performs other data communications functions such as training, equalization, scrambling, encoding, decoding, echo cancellation, precoding, modulation and demodulation. The DTE 102 also contains a user interface 100, such as a video screen, a keyboard, and/or a mouse. The user interface 100 is typically operably coupled to the processor 103 to perform a wide variety of well known functions, such as inputing commands to the processor 103 and displaying features of various applications programs operated by the DTE 102 under the control of the processor 103. Utilizing the interface apparatus 101 for interfacing to the communications channel 105, the processor 103 may contain or operate under other communications applications programs, such as telephone answering, and voice or speech recognition or processing. If coupled to a digital communications channel such as ISDN, the processor 103 may contain or operate under other communications applications programs, such as one for a terminal adapter.

FIG. 2 is an overall block diagram illustrating DTE 102 having a processor 103 and a user interface 100, and a second embodiment of an interface apparatus 101 as disclosed in the related application. As shown in FIG. 2, the interface apparatus 101 has been incorporated within the DTE 102. For example, the interface apparatus 101 may be embodied as a circuit board, an ISA card, a PCMCIA card, or an integrated circuit. As in FIG. 1, the interface apparatus 101 is also connected or coupled to the processor 103 of the DTE 102, using any appropriate arrangement, such as an ISA bus, PCI bus, or PCMCIA slot, and the DTE 102 similarly contains a user interface 100. Continuing to refer to FIG. 2, the interface apparatus 101 is also further connected to the communications channel 105 for data transmission and reception. Also as discussed with reference to FIG. 1, the interface apparatus 101 also performs such functions, typically found in a modem or other data communications device, of ring detection, pulse and tone dialing, and analog-digital conversion. Similarly, the processor 103, containing or operating under a communications application program, such as a modem application program, typically performs other modem functions such as training, equalization, scrambling, encoding, decoding, echo cancellation, preceding, modulation and demodulation.

FIG. 3 is a detailed block diagram illustrating a preferred embodiment of an interface apparatus 101, as disclosed in the related application, for data communications between the DTE 102 and the channel 105. As shown in FIG. 3, an interface apparatus 101 is coupled to or connected within a DTE 102, such as a computer, via bus 107, such as an ISA or PCI bus, and coupled to a communications channel 105, for data transmission and reception. Within the interface apparatus 101, a channel interface circuit 106 receives a data signal transmitted on the channel 105, such as the PSTN. The channel interface circuit 106 may be, for example, a data access arrangement known as a "DAA", which are known in the prior art and may be made of a variety of discrete components, including (without limitation) analog multiplexers, resistors, capacitors, hybrid circuitry, and operational amplifiers, or may be embodied in whole or part as an integrated circuit, and performs such functions as impedance matching, power level adjustment, interconverting four to two wire connections, safety barriers and other related PSTN interface functions. Use of a DAA for the channel interface circuit 106 would be appropriate for connection to an analog line, such as a telephone line, and in that event, the data signal transmitted on and received from the channel would be an analog signal. The channel interface circuit 106 also may be other devices, such as digital interface circuits, suitable for connection to digital lines or channels, including S/T interfaces and U interfaces used for connection to digital services such as ISDN, and which perform such functions as digital data formatting. In that event, the data signal transmitted on and received from the channel would be a digital signal. Typically connected to the channel interface circuit 106 is coder-decoder ("codec") 108 or, equivalently, an analog-to-digital and digital-to-analog converter, referred to herein as an analog-digital ("A/D") converter (such as an SGS Thompson ST 7544 or ST 7545). The codec (or A/D converter) 108 samples and converts a data signal (such as an analog signal) received from the channel 105 (via the channel interface circuit 106) to digital form, and converts digital information to a data signal (such as an analog signal) for transmission over the channel 105. Because of the interchangeability or equivalence of an A/D converter and a codec in the invention, reference to either a codec or an AND converter should be understood to mean and include the other.

Continuing to refer to FIG. 3, the interface apparatus 101 includes a memory 115 illustrated, in the preferred embodiment, as hook FIFO (first in, first out) 110, ring FIFO 112, transmit sample FIFO 114, and receive sample FIFO 116. The memory 115 may be embodied in any form, such as random access memory, and is shown as having separate FIFOs in FIG. 3 for ease of illustration only. In addition, the memory may have formats other than the illustrated first in, first out memory, provided that the memory has a capacity to maintain the stored data in an ordered or sequential manner, such as in the form of a sequence of digital data. The ring FIFO 112 portion of memory is also coupled to a one bit quantizer 118, which is coupled to the channel interface circuit 106, while the hook FIFO is shown directly connected to the channel interface circuit 106. The ring detection and pulse dialing features of the interface apparatus 101, utilizing the hook FIFO 106 and the ring FIFO 112, are discussed in detail in the related application. The transmit sample FIFO 114 and receive sample FIFO 116 are also coupled to the codec (or A/D converter) 108. Each of the FIFO memory circuits is connected to an electromechanical (or optical) interface 120, such as an ISA, PCI or PCMCIA interface, which typically includes a feature, line or connection 122 for address selection and a feature, line or connection 124 for IRQ selection, for proper functioning within the DTE 102. The electromechanical interface 120, such as an ISA interface, PCI interface, or PCMCIA interface, is connected to the bus 107, such as a corresponding ISA, PCI or PCMCIA bus, for connection to a processor, such as processor 103 in DTE 102 in FIGS. 1 and 2. Each of the FIFO memory circuits is also coupled via status line (or bus) 126 to functional block 138, for status monitoring. The functional block 138 contains a clock signal generator (also referred to as a clock or clocking or timing circuitry) 134, an interrupt generator 128, and a status detector 136. (The functional block 138 may also be configured to contain the apparatus 200 of the present invention.) In the preferred embodiment, the functional block 138 may be implemented using ASICs, as separate components, or as integrated circuits (such as its own microprocessor), and may be combined within other functional blocks. These various clock, interrupt and status features (and also possibly the apparatus 200 of the present invention), are included within a functional block 138 for ease of illustration only. The clock signal generator 134, interrupt generator 128, and status detector 136, as contained within functional block 138, are also coupled to the codec (or A/D converter) 108 via line 132, to the channel interface circuit 106 via line 130, and to the electromechanical interface 120 via line (or bus) 140.

The clock signal generator (or clock) 134 may also be contained within the processor 103. The clock signal generator 134 is needed to generate a stable clock signal for the codec (or A/D converter) 108, so that the codec (or A/D converter) 108 may sample an incoming data signal at regular, definite, determinate or otherwise predetermined intervals, referred to as a first or determinate frequency, to obtain an accurate representation of the received signal consisting of a continuous stream of digital values, and to accurately form an outgoing data signal (such as an analog signal) for transmission from a continuous stream of digital values.

Continuing to refer to FIG. 3, the interface apparatus 101 functions to receive an incoming signal (such as a data signal) through the channel interface circuit 106, which is sampled and converted to digital form by the codec (or A/D converter) 108 at a first or determinate frequency, and to transmit an outgoing signal (such as a data signal) on the channel 105 generated by the codec (or A/D converter) 108 from digital data, also at a first or determinate frequency. The samples of the received signal are transferred to and stored in the receive sample FIFO 116. As monitored by the status detector 136 via status line (or bus) 126, when a sufficient or predetermined number of samples have been transferred and stored in the receive sample FIFO 116, the interrupt generator 128 generates an interrupt signal (or first interrupt signal) to the processor 103, which is transmitted to the processor 103 via the electromechanical interface 120 and the bus 107. The first interrupt signal, or any other equivalent signal, serves to indicate to the processor 103, as programmed or incorporated within the communications application program and/or the operating system, that the processor 103 should read, into processor memory, the samples held in the receive sample FIFO 116, within a predetermined period of time. In response to the first interrupt signal, the processor 103 is programmed to acknowledge the first interrupt signal, and to read the samples into processor memory from the receive sample FIFO 116. The receive sample FIFO 116 has then been emptied, and may be refilled by new incoming data from the codec (or A/D converter) 108. If the memory is embodied in a different form which is not a FIFO, then the information stored in the memory may be written over or otherwise revised by the new incoming data.

Simultaneously during the same interrupt cycle (i.e., in response to the same, first interrupt signal), the processor may write digital data into the transmit sample FIFO 114, transmitted via the electromechanical interface 120. The digital data from the processor is stored in the transmit sample FIFO 114 for conversion into an outgoing data signal (such as an analog signal) by the codec (or A/D converter) 108, at a first or determinate frequency, for data transmission. As the codec (or A/D converter) 108 generates an outgoing data signal from the digital data stored in the transmit sample FIFO, the transmit sample FIFO is emptied, and may be refilled during the next interrupt cycle by the processor. Alternatively, the sequence of steps of writing and storing digital data and forming an outgoing data signal may be in response to a second interrupt signal, which may or may not have the same form as or be identical to the first interrupt signal. For example, in various embodiments, it may be desirable to control the data transmission process separately and independently from the data reception process, in which case the second interrupt signal should be distinguishable in some manner from the first interrupt signal.

In the preferred embodiment, the transmit sample FIFO 114 and the receive sample FIFO 116 each have a capacity to store at least 18 samples, determined on the basis of a V.32 bis symbol rate of 2400, a sampling clock of 7200 Hz for three samples per symbol, at a rate of six symbols per interrupt (or interrupt cycle), resulting in eighteen samples per interrupt. The interrupt rate is then below 1 kHz at 400 Hz. Each of these various parameters may be modified depending upon the symbol rate, the sampling rate, the desired data transmission protocol or standard (such as V.32, V.32 bis, or V.34), any desired interrupt rate, and any desired implementation (such as in ASICs). In addition, memory storage capacity may be increased or decreased depending upon the desired level of protection against potential data overrun and data underrun conditions. For example, a longer interval between interrupt signals would tend to require transmit and receive memory circuits having a greater capacity than 18 samples, to avoid data overrun and underrun conditions. In the preferred embodiment, the transmit sample FIFO 114 and the receive sample FIFO 116 each have a capacity to store 32 samples, to avoid data overruns (if the processor does not respond quickly enough to the interrupt signal and incoming data continues to accumulate), and to avoid data underruns (if the processor does not respond quickly enough to the interrupt signal and outgoing data begins to be depleted).

FIG. 4 is a block diagram illustrating the load balancing apparatus 200 in accordance with the present invention. The load balancing apparatus 200 may be embodied as an integrated circuit, typically as a programmable processor or microprocessor. In the preferred embodiment, the load balancing apparatus 200 is embodied within the processor 103 of the DTE 102. Alternatively, the load balancing apparatus 200 may be embodied within the interface apparatus 101, for example, as an integrated circuit within or forming the functional block 138. In FIG. 4, the load balancing apparatus 200 is illustrated separately from the processor 103 and the interface apparatus 101 solely for the purposes of ease of illustration and explanation.

Referring to FIG. 4, FIG. 4 illustrates the load balancing apparatus 200 operably coupled or connected to (or within) the processor 103 of the DTE 102, and also operably coupled to an interface apparatus 101 for data communications via the channel 105. The load balancing apparatus 200 includes three functional blocks, a load selector 205 (also equivalently referred to as a loading selector 205), a priority translator 210, and a modulation mode controller 215, which are each operably interconnected to each other via memory circuits 207. Equivalently, these functional blocks may be interconnected in any variety of ways, such as through a line or bus. The memory circuits 207 may be and preferrably are part of or incorportated within the processor 103. The DTE 102 includes a user interface 100 and a processor 103. The processor 103 is illustrated as having a plurality of functional blocks programmed or containing information for data communications. The processor 103 includes a file services block 220 and a file memory block 225 for obtaining a data file from a memory within the DTE, such as a hard drive or a file server. Via a file input/output block 230, data files may be processed by the processor for data compression using ITU V.42 bis standard in the V.42 bis data compression block 235, and for error control (such as error correction encoding) using the V.42 standard in V.42 error control block 240. Within the processor 103, each of these blocks is also operably interconnected via memory circuits (or via a bus) 250 with each other, with the user interface 100, and with modulation mode selection block 245. In conjunction with or as part of a communications application program, and in conjunction with the modulation mode controller 215, the modulation mode selection block 245 of the processor 103 will implement various modulation modes and features, such as modulation modes V.34, V.32 bis, V.32, V.22 bis, V.22, Bell 103, and features such as V.42 bis data compression and V.42 error control. The processor 103 and the user interface 100 are also operably interconnected with the load balancing apparatus 200 which, as mentioned above, is preferrably programmed as functional blocks within the processor 103.

The operation of the load balancing apparatus 200 illustrated in FIG. 4 is expected to vary depending upon the various method embodiments (illustrated in FIGS. 5 and 6), and depending upon the operating system of the DTE 102. For example, certain features and varying processor capacity may be available in a workstation environment with a UNIX operating system, compared to OS/2 Warp, various Windows or Macintosh operating systems. Continuing to refer to FIG. 4, in the event that data transmission is to occur via a communications application program in the processor 103, the loading selector 205 generates a prompt or window appearing on the user interface 100, typically in the form of a graphical user interface, directing the user to establish priorities among any concurrently operating applications programs. For example, a user may desire to operate a spreadsheet program simultaneously with or during a file transfer using the data communications program. The user may determine that the spreadsheet program has a higher priority than the data transmission, and via the user interface 100, would correspondingly assign a higher priority to the spreadsheet program and a lower priority to the data transmission. Conversely, the user may determine that data transmission has the higher priority. This prioritization may be implemented in any fashion, such as a numerical assignment of 1 to the highest priority, 2 to the second priority, 3 to the third priority, and so on, or may be implemented through settings appearing on a graphical user interface, such as an illustrated sliding bar having high, medium and low settings. The loading selector 205 determines if any priorities have been established or entered and, if so, reads those priorities (or other selections discussed with reference to FIG. 6) from the user interface 100, and transmits corresponding priority information to the priority translator 210, including a data transfer priority and any other priority information. In the event the user fails to enter or determine the data transfer priorities, such that the load selector 205 is unable to read those priorities or reads that none have been entered, the load selector 205 may determine the data transfer priority based on default values, e.g., assume the user prefers a high data rate and provides a highest priority to data transfer.

Based upon the data transfer priority or other priority information from the loading selector 205, the priority translator 210 determines an amount or degree of availability of the processor 103 for operating the various applications programs selected and prioritized by the user. Again, as mentioned above and as used herein, processor availability means and refers to the amount or degree to which the processor is available, such as through the amount or degree of processor cycles, for example, to operate applications programs, after any processing needed or consumed by the operating system or other necessary non-applications programs. Processor availability may be either an absolute or a relative value. For example, if the user has given the highest priority to data transmission and has not selected other applications programs for concurrent operation, the priority translator may determine that there is close to one hundred percent processor availability, i.e., 100% of the remainder of the processor is available for data transmission processing (after operating system processing). Similarly, if the user has given the highest priority to data transmission and has selected another applications programs for concurrent operation having a secondary priority, the priority translator may determine that there is approximately seventy-five percent processor availability for data transmission processing, with the remaining 25 percent available for the other applications program. Conversely, the user may have a low priority to data transmission, and depending upon the degree to which the higher priority applications will utilize the processor, there may be a wide range of processor availability for data transmission, from no availability to significant availability.

Relative or absolute processor availability may be determined empirically or estimated in a variety of ways, based upon the physical parameters of the processor 103, such as operating speed, and other factors such as the operating system of the DTE 102 and the degree of complexity of the various applications programs and selected modulation modes. For example, based upon the complexity of the V.34 modulation mode and given a Pentium® class processor, close to 100% processor availability may be needed to implement a V.34 modulation mode at certain data rates and symbol rates, such as a 28.8 kbps data rate, while less processor availability may be needed to implement a 19.2 kbps data rate using a 2400 symbol rate. Conversely, comparatively little processor availability may be needed to implement other modulation modes, such as V.22 or Bell 103. Similarly, for example, it may be determined that certain spreadsheet programs run at an acceptable level only when lower data rate modulation modes are utilized, such as V.32 bis or V.32, resulting in an empirical determination of comparative or relative processor availability which may be programmed into or otherwise utilized by the priority translator 210.

From the processor availability (or relative processor availability), the priority translator 210 then maps or translates the processor availability to at least one of a plurality of modulation modes to form a subset of modulation modes. For example, 100% processor availability may map to the maximum data rate mode, currently the V.34 modulation mode, and all lower (or lesser included) data rate modes, including V.32 bis, V.32, V.22 bis, V.22, and Bell 103, forming a subset of modulation modes. As used herein, subsets may be designated by the maximum data rate mode, and are considered to include all lower data rate modes. For example, a V.32 subset would include V.32, V.22 bis, V.22 and Bell 103, while excluding V.34 and V.32 bis. Decreased processor availability for communications applications, relative, comparative or absolute, may map to fewer modulation modes. For example, 75% processor availability may map to V.32 bis (and lower data rate modes), and exclude V.34. In addition, based upon processor availability, in the preferred embodiment, the priority translator 210 will also map processor availability to the V.42 bis data compression feature and to the V.42 error control feature. For example, given 100% processor availability, the V.42 bis data compression block 235 and the V.42 error control block 240 would be utilized by the processor 103 in preparing and modulating the data for transmission. If there is less relative processor availability, either or both of these features may be excluded by the priority translator 210 for use in data transmission.

Following the determination of the subset of modulation modes by the priority translator, the modulation mode controller 215 allows the data transmission initiation and training processes to begin, such as going off hook, dialing, and other call set up procedures, utilizing the interface apparatus 101 and a communications application program operated by the processor 103 within the DTE 102. Given the automode process, however, the modulation mode controller 215 limits the automode process to the subset of modulation modes. For example, if V.34 and V.32 bis are not included in the subset of modulation modes, the modulation mode controller will limit the automode process to the modulation modes within the subset, such as V.32 and any of the lesser included, lower rate modes V.22 bis, V.22, and so on. After appropriate training with this limited automode process, a modulation mode of the subset of modulation modes will have been mutually selected and instituted by the local and remote DCDs (via their respective communications applications programs and modulation selection selection blocks 245, if the DCDs are not themselves complete modems), and the modulation mode controller 215 then allows data transmission to occur between the processor 103 and the channel 105, through the interface apparatus 101.

Alternatively to the rank ordering prioritization discussed above, the load balancing apparatus 200 illustrated in FIG. 4 may utilize other methods of modulation mode or data rate selection. Through the user interface 100, the loading selector block 205 may provide for a more direct selection of a modulation mode or data rate, without a determination of processor availability for applications programs to be operating concurrently. For example, the load selector block 205 may generate a prompt such as a graphical user interface (displayed on the user interface 100), directing the specific determination of a priority for data transfer, such as data transfer priority having a comparative or relative value such as highest, high, medium, low, or lowest, or a ranking, such as 1, 2, 3, and so on. The load selector block 205 then reads the selected data transfer priority entered from the user interface 100 and, again, if none is provided, substitutes or provides a default value for the data transfer priority. The priority translator 210 then directly maps the data transfer priority to a subset of modulation modes. For example, a highest priority may map or translate to the subset of modulation modes including V.34 (and all lesser included, lower rate modes), a high priority may map to the subset of modulation modes including V.32 bis (and all lesser included, lower rate modes, but excluding V.34), medium may map to a V.32 subset, low may map to a V.22 bis subset, and so on. As discussed above, the modulation mode controller 215 would than allow the DCDs to initiate communication and train, limiting automode to the subset of modulation modes, and subsequently instituting one of the modulation modes and allowing data to be transferred (in conjunction with a data communications program operating within the processor 103 and its functional program blocks, such as modulation mode selection block 245 and file services block 220).

Correspondingly, the user may directly select a data rate as a data transfer priority, such as, for example, 9600 bps, 14.4 kbps, or 28.8 kbps. In these circumstances, the priority translator 210 would map the selected data rate, as a data transfer priority, to a different type of subset of modulation modes, characterized by the minimum mode needed to operate at that specific data rate. For example, 9600 bps would map to V.32, V.32 bis and V.34, and would exclude V.22 bis, V.22 and Bell 103; 14.4 kbps would map or translate to a subset of modulation modes including only V.32 bis and V.34; and 28.8 kbps or 19.2 kbps would map only to V.34. In these circumstances, to maximize processor availability for other applications programs, the modulation mode controller 215 would limit the automode functions to the minimum or simpler modulation mode needed to operate at that selected data rate. For example, if the user has selected a 9600 bps data rate, automode would be limited to V.32, as the added complexity and processor time needed to implement V.32 bis or V.34 would be unnecessary given the user's data transfer priority (as indicated by the data rate selection). Depending upon other circumstances, with direct data rate selection, automode may be overridden entirely by, for example, limiting automode to only one modulation mode.

In addition, if V.34 data rates are selected, either directly through data rate selection or through other high data transfer priorities mapped to the V.34 modulation mode, the priority translator 210 would also map the data transfer priority to a corresponding symbol rate or corresponding subset of symbol rates for data transfer. For example, if 28.8 kbps were selected, the priority translator 210 would also map the data transfer priority to a subset of symbol rates including only 3429 and 3200. If 24.0 kpbs were selected, the priority translator 210 would also map the data transfer priority to a subset of symbol rates excluding only 2400, and including 2743, 2800, 3000, 3200 and 3429.

In conjunction with the interface apparatus 101, the load balancing apparatus 200 is able to affect processor availability during data transfer processes through the generation of the interrupt signal discussed above. Also as discussed above, depending upon the modulation mode and corresponding data rate, the interrupt signal to the processor 103 may be generated at a correspondingly higher or lower rate or frequency. For example, the selection of a low data rate would correspond to a reduced need for, and hence a lower rate of, interrupt signals. Alternatively in an interface apparatus 101 implementation of the present invention, a status register in the interface apparatus 101 may be read by the processor to indicate a suitable or selected modulation mode, which would also be indicative of the expected interrupt rate. Accordingly, depending upon the selected data rate priorities or selected data rate, the rate or frequency of the interrupt signal to the processor will vary, resulting in greater or lesser processor availability for operating concurrent applications programs.

In summary, FIG. 4 illustrates an apparatus for load balancing for a processor 103 operable in data terminal equipment 102 having a plurality of applications programs, the plurality of applications programs including a communications application program, with the data terminal equipment 102 having a capacity to concurrently operate the plurality of application programs, the processor 103 coupled through an interface apparatus 101 to a channel 105 for data transmission and reception, and with the data terminal equipment having a user interface. The load balancing apparatus 200 then comprises, first, a loading selector 205 coupleable to the user interface 100 for selection of a priority for data transfer to form a data transfer priority; second, a priority translator 210 coupled to the loading selector 205, with the priority translator 210 responsive to the selection of the data transfer priority to map the data transfer priority to at least one of a plurality of modulation modes to form a subset of modulation modes; and third, a modulation mode controller 215 coupled to the priority translator 210, the modulation mode controller 215 responsive to the formation of the subset of modulation modes to limit data transfer automode operations to the subset of modulation modes, and the modulation mode controller 215 further responsive, in conjunction with the communications applications program, to institute a modulation mode of the subset of modulation modes for data transfer between the processor 103 and the channel 105. As mentioned above, the loading selector 205, the priority translator 210, and the modulation mode controller 215 may be implemented or embodied in the controller 103, in the interface apparatus 200, or any other equivalent device.

Also as discussed above, depending upon the implementation chosen, the priority translator 210 may also be responsive to determine a relative or an absolute processor availability for operation of the communications application program based on the data transfer priority and further responsive to map the processor availability to at least one of a plurality of modulation modes to form the subset of modulation modes. The priority translator 210 may also map the data transfer priority to a data compression mode to form a selected data compression mode and map the data transfer priority to an error control mode to form a selected error control mode, and further, the modulation mode controller is further responsive, in conjunction with the communications applications program, to institute the selected data compression mode and the selected error control mode for data transfer between the processor 103 and the channel 105. Also as mentioned with regard to modulation modes such as V.34, the priority translator 210 may also be responsive to map the data transfer priority to at least one symbol rate of a plurality of symbol rates to form a subset of symbol rates corresponding to the subset of modulation modes.

Also in summary, in the preferred embodiment, the loading selector 205 is responsive to generate a prompt, such as a window or other graphical user interface, appearing on the user interface 100 for a provision of the data transfer priority, and to read the data transfer priority from the user interface 100 provided in response to the prompt. The priority translator 210 is also responsive, in the preferred embodiment, to determine whether the data transfer priority was provided in response to the prompt, and in the event that a data transfer priority was not provided in response to the prompt, the priority translator 210 is responsive to determine the data transfer priority based on a default value. In addition, as discussed below, depending upon the modulation mode, such as V.34, the priority translator 210 may determine whether the data transfer priority has been modified and, when the data transfer priority has been modified, the priority translator 210 causes an interrupt signal to the controller 103 to be generated (such as via the interrupt generator 128) to interrupt data transfer. The priority translator 210 then maps the modified data transfer priority to at least one of a plurality of modulation modes to form a modified subset of modulation modes, followed by the modulation mode controller 215 instituting retraining and limiting data transfer automode operations to the modified subset of modulation modes, and in conjunction with the communications applications program, instituting a modulation mode of the modified subset of modulation modes for data transfer between the processor and the channel.

Also in summary, and as used herein, a data transfer priority may have many different versions, depending upon the chosen implementation or embodiment. In one embodiment, the data transfer priority is a comparative or relative value, such as high, medium or low, which is then mapped to a modulation mode or a data rate. In another embodiment, the data transfer priority is comparative value relative to at least one of a plurality of priorities, the plurality of priorities corresponding to applications programs selected for operation concurrently with the communications application programs. In other embodiments, the data transfer priority is a modulation mode, directly chosen by the user, such as V.34 or V.32 bis, or is a data rate directly chosen by the user, such as 28.8 kbps. Also depending upon the embodiment, the priority translator 210 may allocate a predetermined amount of processor availability corresponding to the data transfer priority, such as allocating close to 100% processor availability for V.34, but possibly only 50% for V.32.

Figure 5:
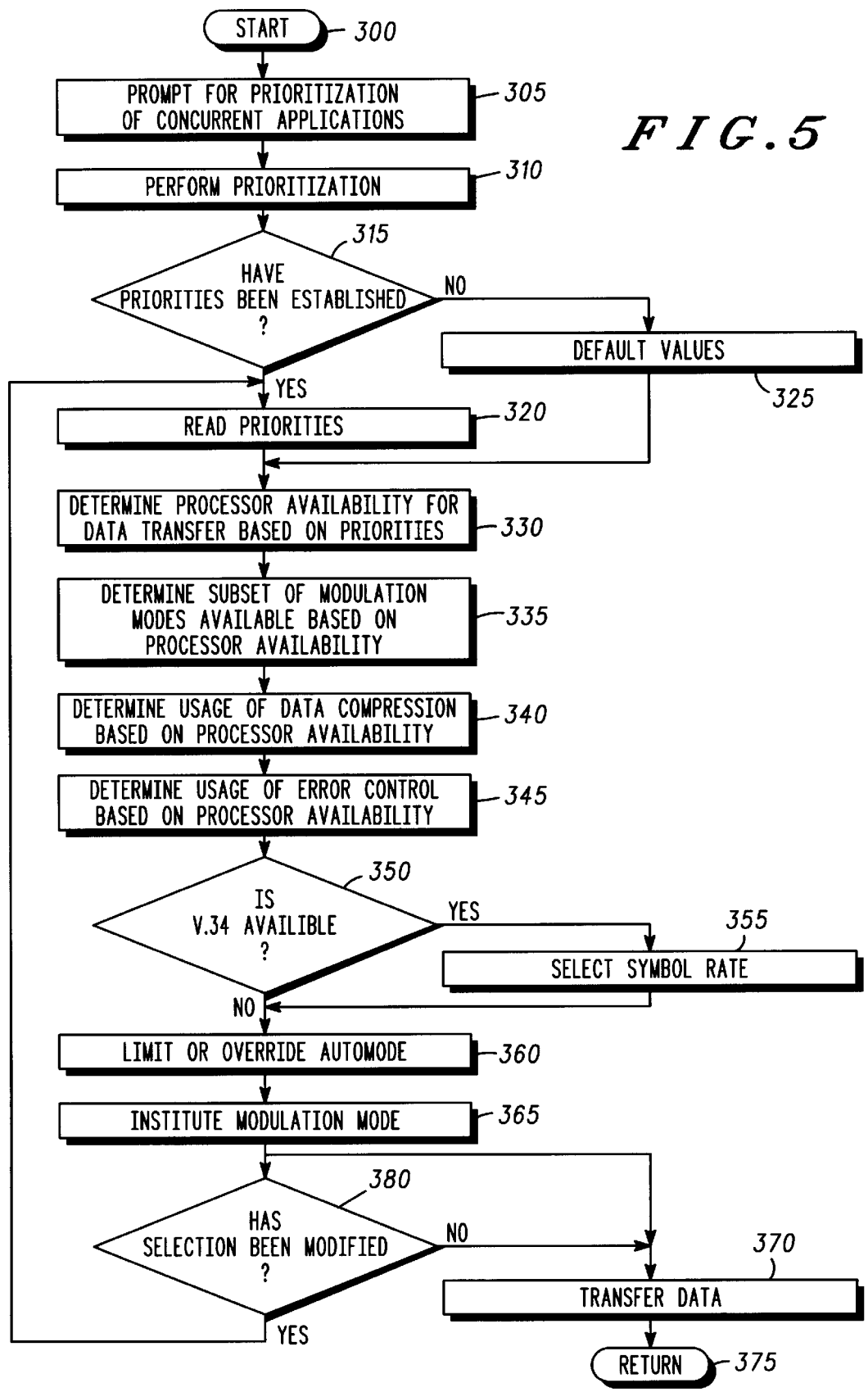
FIG. 5 is a flow diagram illustrating a first load balancing method in accordance with the present invention.

FIG. 5 is a flow diagram illustrating one of the method embodiments in accordance with the present invention. Beginning with start step 300, the method generates a prompt for prioritization of concurrent applications, step 305, preferably generated as a graphical user interface. Next, priorities may be established, step 310. The process determines if the priorities have been established, step 315, and reads these priorities, step 320. If the user did not establish priorities, the process substitutes default values for the data transfer priorities, step 325. These steps are analogous to the processing provided by the load selector 205 and user interface 100 as illustrated in FIG. 4. Based on the data transfer priorities, the process determines processor availability for data transfer, step 330, and determines a subset of modulation modes, step 335. Also depending upon processor availability, the process determines if data compression protocols should be implemented, step 340, and also if error control protocols should be implemented, step 345. Next, if a V.34 modulation mode was selected or available, the processor selects a corresponding symbol rate, steps 350 and 355. These steps are analogous to the processing provided by the priority translator 210 as illustrated in FIG. 4. The process then limits or overrides the automode process, step 360, and institutes a modulation mode, through, for example, the data transfer training process, step 365. For example, the method may include limiting the data transfer automode operations to a data rate which does not exceed the maximum data rate available from the subset of modulation modes. Data is then transferred, step 370, and the process is complete, step 375. These steps are analogous to the processing provided by the modulation mode controller 215, in conjunction with the processor 103 and the interface apparatus 101, also as illustrated in FIG. 4.

Figure 6:
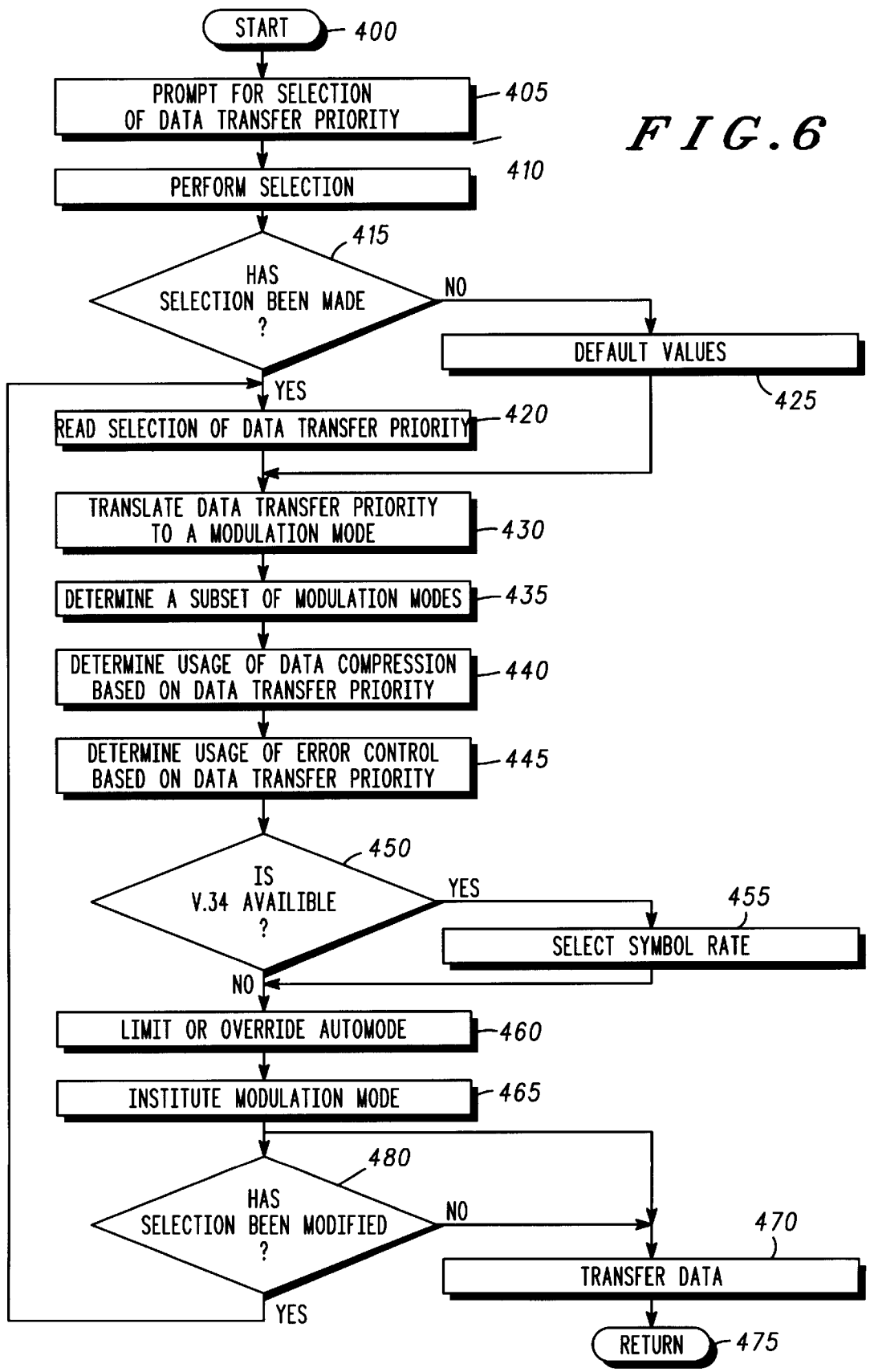
FIG. 6 is a flow diagram illustrating a second load balancing method in accordance with the present invention.

FIG. 6 is a flow diagram illustrating a second method embodiment in accordance with the present invention. Beginning with start step 400, the method generates a prompt for selection of a desired level for a data transfer priority, a modulation mode, or a data rate, step 405, also preferably generated as a graphical user interface. Next, a selection is performed, step 410. For example, as discussed above, the user may select a data transfer priority, such as high, medium, or low; or directly select a modulation mode such as V.34, or directly select a data rate, such as 19.2 kbps. The process determines if a selection has been made, step 415, and reads the selection, step 420. If the user did not make a selection, the process substitutes a default value for the selection, step 425. These steps are analogous to the processing provided by the load selector 205 and user interface 100 as illustrated in FIG. 4. Based on the selection and depending upon the implementation, the process translates the selection to a modulation mode for data transfer, step 430, and determines a subset of modulation modes, step 435. For example, a selection of high priority may be translated to a V.34 mode, while these step may be omitted if the user directly selects a data rate or modulation mode. Also depending upon the data transfer priority selection, the process determines if data compression protocols should be implemented, step 440, and also if error control protocols should be implemented, step 445. Next, if a V.34 modulation mode was selected or available, the processor selects a corresponding symbol rate, steps 450 and 455. These steps are analogous to the processing provided by the priority translator 210 as illustrated in FIG. 4. The process also then limits or overrides the automode process, step 460, and institutes a modulation mode, through, for example, the data transfer training process, step 465. Data is then transferred, step 470, and the process is complete, step 475. These steps are analogous to the processing provided by the modulation mode controller 215, in conjunction with the processor 103 and the interface apparatus 101, also as illustrated in FIG. 4.

Also illustrated in FIG. 5, step 380, and FIG. 6, step 480, if a V.34 modulation mode is selected, that selection may be modified during data transmission, as V.34 provides for DCD retraining without call termination. In this event, both methods discussed above may include additional steps, including determining whether the data transfer priority has been modified, and if so, returning to step 320 (of FIG. 5) or to step 420 (of FIG. 6), and repeating the process steps, including retraining the DCD to the new or modified data transfer priority.

A significant advantage of the present invention is the capability provided to a user of data terminal equipment to concurrently and effectively operate both a communications application program for data transfer, and one or more other applications programs for other purposes. The user may choose directly the data modulation mode or data rate according to the user's individual preferences and priorities, or may prioritize applications, resulting in an indirect selection of modulation mode and data rate. In either situation, the user is able to override or limit the automode operations of the prior art, resulting in a more efficient use of potentially limited processor resources and availability.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. A method of load balancing for a processor operable in data terminal equipment having a plurality of applications programs, the plurality of applications programs including a communications application program, the data terminal equipment having a capacity to concurrently operate the plurality of application programs, the processor coupled through an interface apparatus to a channel for data transmission and reception, the method comprising:
   (a) selecting a priority for data transfer to form a data transfer priority;
   (b) determining a processor availability for operation of the communications application program based on the data transfer priority;
   (c) mapping the processor availability to at least one of a plurality of modulation modes to form a subset of modulation modes;
   (d) limiting data transfer automode operations to the subset of modulation modes; and
   (e) instituting a modulation mode of the subset of modulation modes for data transfer between the processor and the channel.

2. The method of claim 1 further comprising:
   (f) mapping the processor availability to a data compression mode to form a selected data compression mode; and
   (g) instituting the selected data compression mode for data transfer between the processor and the channel.

3. The method of claim 1 further comprising:
   (h) mapping the processor availability to an error control mode to form a selected error control mode; and
   (i) instituting the selected error control mode for data transfer between the processor and the channel.

4. The method of claim 1, wherein the data transfer priority is a comparative value.

5. The method of claim 1, wherein the data transfer priority is a modulation mode.

6. The method of claim 1, wherein the data transfer priority is a data rate.

7. The method of claim 1, wherein the data transfer priority is a comparative value relative to at least one of a plurality of priorities, the plurality of priorities corresponding to applications programs selected for operation concurrently with the communications application programs.

8. The method of claim 1, wherein step (b) further comprises determining whether a data transfer priority was selected in step (a), and when a data transfer priority was not selected in step (a), determining the data transfer priority based on a default value.

9. The method of claim 1 wherein step (b) further comprises allocating a predetermined amount of processor availability corresponding to the data transfer priority.

10. The method of claim 1 wherein step (c) further comprises mapping the processor availability to at least one symbol rate of a plurality of symbol rates to form a subset of symbol rates corresponding to the subset of modulation modes.

11. The method of claim 1 wherein step (d) further comprises limiting the data transfer automode operations to a data rate which does not exceed the maximum data rate available from the subset of modulation modes.

12. The method of claim 1 further comprising:
   (j) determining whether the data transfer priority has been modified;
   (k) when the data transfer priority has been modified, repeating steps (b) and (c) to form a modified subset of modulation modes and interrupting step (e);
   (l) limiting data transfer automode operations to the modified subset of modulation modes; and
   (m) instituting via the communications applications program a modulation mode of the modified subset of modulation modes for data transfer between the processor and the channel.

13. A method of load balancing for a processor operable in data terminal equipment having a plurality of applications programs, the plurality of applications programs including a communications application program, the data terminal equipment having a capacity to concurrently operate the plurality of application programs, the processor coupled through an interface apparatus to a channel for data transmission and reception, the method comprising:
   (a) generating a prompt for a provision of a data transfer priority;
   (b) reading the data transfer priority provided in response to the prompt of step (a);
   (c) mapping the data transfer priority to at least one of a plurality of modulation modes to form a subset of modulation modes;
   (d) limiting data transfer automode operations to the subset of modulation modes; and
   (e) instituting a modulation mode of the subset of modulation modes for data transfer between the processor and the channel.

14. The method of claim 13 further comprising:

(f) mapping the data transfer priority to a data compression mode to form a selected data compression mode; and (g) instituting the selected data compression mode for data transfer between the processor and the channel.

15. The method of claim 13 further comprising:

(h) mapping the data transfer priority to an error control mode to form a selected error control mode; and (i) instituting the selected error control mode for data transfer between the processor and the channel.

16. The method of claim 13 wherein step (b) further comprises:

determining the data transfer priority based on a default value when a data transfer priority has not been provided in response to the prompt of step (a).

17. The method of claim 13, wherein the data transfer priority is a comparative value.

18. The method of claim 13, wherein the data transfer priority is a modulation mode.

19. The method of claim 13, wherein the data transfer priority is a data rate.

20. The method of claim 13, wherein the data transfer priority is a comparative value relative to at least one of a plurality of priorities, the plurality of priorities corresponding to applications programs selected for operation concurrently with the communications application programs.

21. The method of claim 13 wherein step (b) further comprises allocating a predetermined amount of processor availability corresponding to the data transfer priority.

22. The method of claim 13 wherein step (c) further comprises mapping the data transfer priority to at least one symbol rate of a plurality of symbol rates to form a subset of symbol rates corresponding to the subset of modulation modes.

23. The method of claim 13 wherein step (d) further comprises limiting the data transfer automode operations to a data rate which does not exceed the maximum data rate available from the subset of modulation modes.

24. The method of claim 13 further comprising:

(j) determining whether the data transfer priority has been modified;

(k) when the data transfer priority has been modified, repeating steps (b) and (c) to form a modified subset of modulation modes and interrupting step (e);

(l) limiting data transfer automode operations to the modified subset of modulation modes; and (m) instituting a modulation mode of the modified subset of modulation modes for data transfer between the processor and the channel.

25. An apparatus for load balancing for a processor operable in data terminal equipment having a plurality of applications programs, the plurality of applications programs including a communications application program, the data terminal equipment having a capacity to concurrently operate the plurality of application programs, the processor coupled through an interface apparatus to a channel for data transmission and reception, the data terminal equipment having a user interface, the apparatus comprising:

a loading selector coupleable to the user interface for selection of a priority for data transfer to form a data transfer priority;

a priority translator coupled to the loading selector, the priority translator responsive to the selection of the data transfer priority to map the data transfer priority to at least one of a plurality of modulation modes to form a subset of modulation modes; and a modulation mode controller coupled to the priority translator, the modulation mode controller responsive to the formation of the subset of modulation modes to limit data transfer automode operations to the subset of modulation modes, and the modulation mode controller further responsive, in conjunction with the communications applications program, to institute a modulation mode of the subset of modulation modes for data transfer between the processor and the channel.

26. The apparatus of claim 25 wherein the loading selector, the priority translator, and the modulation mode controller are implemented in the controller.

27. The apparatus of claim 25 wherein the loading selector, the priority translator, and the modulation mode controller are implemented in an interface apparatus.

28. The apparatus of claim 25 wherein the priority translator is further responsive to determine a processor availability for operation of the communications application program based on the data transfer priority and further responsive to map the processor availability to at least one of a plurality of modulation modes to form the subset of modulation modes.

29. The apparatus of claim 25 wherein the priority translator is further responsive to map the data transfer priority to a data compression mode to form a selected data compression mode and wherein the modulation mode controller is further responsive, in conjunction with the communications applications program, to institute the selected data compression mode for data transfer between the processor and the channel.

30. The apparatus of claim 25 wherein the priority translator is further responsive to map the data transfer priority to an error control mode to form a selected error control mode and wherein the modulation mode controller is further responsive, in conjunction with the communications applications program, to institute the selected error control mode for data transfer between the processor and the channel.

31. The apparatus of claim 25, wherein the loading selector is responsive to generate a prompt appearing on the user interface for a provision of the data transfer priority, and wherein the loading selector is further responsive to read the data transfer priority from the user interface provided in response to the prompt.

32. The apparatus of claim 31, wherein the priority translator is further responsive to determine whether the data transfer priority was provided in response to the prompt, and when a data transfer priority was not provided in response to the prompt, the priority translator further responsive to determine the data transfer priority based on a default value.

33. The apparatus of claim 25, wherein the data transfer priority is a comparative value.

34. The apparatus of claim 25, wherein the data transfer priority is a modulation mode.

35. The apparatus of claim 25, wherein the data transfer priority is a data rate.

36. The apparatus of claim 25, wherein the data transfer priority is a comparative value relative to at least one of a plurality of priorities, the plurality of priorities corresponding to applications programs selected for operation concurrently with the communications application programs.

37. The apparatus of claim 25, wherein the priority translator is further responsive to allocate a predetermined amount of processor availability corresponding to the data transfer priority.

38. The apparatus of claim 25, wherein the priority translator is further responsive to map the data transfer priority to at least one symbol rate of a plurality of symbol rates to form a subset of symbol rates corresponding to the subset of modulation modes.

39. The apparatus of claim 25 wherein the modulation mode controller is further responsive to limit the data transfer automode operations to a data rate which does not exceed the maximum data rate available from the subset of modulation modes.

40. The apparatus of claim 25, wherein the priority translator is further responsive to determine whether the data transfer priority has been modified and, when the data transfer priority has been modified, the priority translator is further responsive to cause an interrupt signal to the controller to be generated to interrupt data transfer, to map the modified data transfer priority to at least one of a plurality of modulation modes to form a modified subset of modulation modes; and wherein the modulation mode controller is further responsive to limit data transfer automode operations to the modified subset of modulation modes, and in conjunction with the communications applications program, to institute a modulation mode of the modified subset of modulation modes for data transfer between the processor and the channel.

* * * * *